Figure 1:
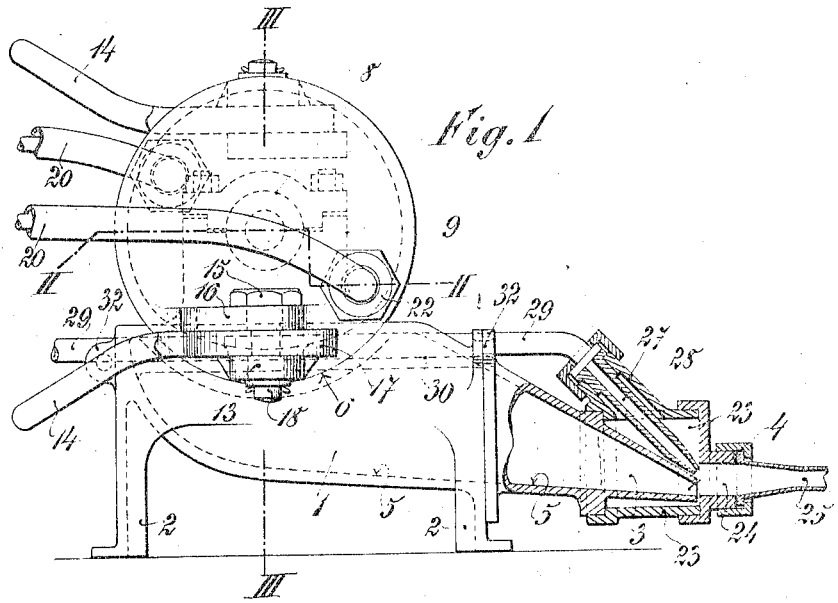

G. GABRYS.
PORTABLE MELTING APPARATUS.
APPLICATION FILED OCT. 17, 1912.

1,082,314.

Patented Dec. 23, 1913.
2 SHEETS—SHEET 1.

Witnesses
Frank H. Logan
Alfred F. Anderson

Inventor
Georg Gabrys
By F. Van Deusenmul
Attorney

G. GABRYS.
PORTABLE MELTING APPARATUS.
APPLICATION FILED OCT. 17, 1912.

1,082,314.

Patented Dec. 23, 1913.

2 SHEETS—SHEET 2.

Witnesses
Frank H Logan
Alfred R Anderson

Inventor
Georg Gabrys
By J Van Dedemul
Attorney

UNITED STATES PATENT OFFICE.

GEORG GABRYS, OF BUDAPEST, AUSTRIA-HUNGARY, ASSIGNOR OF FORTY-FIVE ONE-HUNDREDTHS TO FRANK YOKEL AND FORTY-FIVE ONE-HUNDREDTHS TO ADOLF STEFFEN, BOTH OF MERIDEN, CONNECTICUT.

PORTABLE MELTING APPARATUS.

1,082,314.  Specification of Letters Patent.  Patented Dec. 23, 1913.

Application filed October 17, 1912. Serial No. 726,263.

*To all whom it may concern:*

Be it known that I, GEORG GABRYS, a subject of the King of Hungary, residing at Budapest, Austria-Hungary, have invented new and useful Improvements in Portable Melting Apparatus; and I do hereby declare the following to be a full, clear, and exact description of the same.

This invention relates to a readily portable apparatus for the continuous melting of any kind of metals or alloys and for the continuous discharge of the molten metal.

This apparatus has essentially for its object to provide a readily portable apparatus capable of melting metals and alloys efficiently, and of supplying the molten metal in a continuous stream.

The apparatus is particularly intended for use in processes involving the coating of objects by spraying molten metal thereagainst, but is also adaptable for various other uses.

In this specification I will describe the use of the apparatus with particular reference to its use for the supply of molten metal for such spraying processes; but it is to be understood in so doing I do not limit the apparatus to any such use. So portable is the apparatus that one man can carry the apparatus about on ladders or scaffolding and can manipulate the apparatus and pour or apply the metal in any direction either downward, laterally or upward. It is thus possible to cast monuments on the spot in one piece of any kind of metal or to coat them with metal and yet retain the artistic modeling. For example, roofs, bridges, large boilers or tanks and the like can be provided in like manner on the spot with a protecting metal coating.

The melting apparatus embodying my invention comprises a collecting vessel for receiving the molten metal and discharging it in a continuous stream, upon which collecting vessel a plurality of melting vessels are mounted in the particularly advantageous manner hereinafter described; the construction being such that after a charge of metal has been melted in one of these melting vessels, the latter may be rotated into position to discharge its molten contents into the collecting vessel, such discharge, however, being controlled by a suitable valve with which each such melting vessel is provided. These melting vessels may be heated in any suitable manner, as for example by a gas or oil blast-flame.

It is obvious that by alternately charging the melting vessels and alternately discharging their contents into the collecting vessel, the latter can be continuously supplied with metal, whereby the continuous working of the apparatus is insured. Owing to the alternate charging of the melting vessels, the latter may have very small dimensions and *in natura*, they may have a capacity of 2–3 kilos at the most, so that the collecting vessel may therefore also have very small dimensions, because it need only hold a little more than one of the melting vessels. This circumstance permits the apparatus to be made very portable in character, so that it may be moved from place to place very readily, and may even be operated while being carried about, because the whole apparatus *in natura* and in the working condition will have a weight of about 20–25 kilos.

A constructional form of this apparatus with two melting vessels is shown by way of example in the accompanying drawing, of which—

Figure 2:
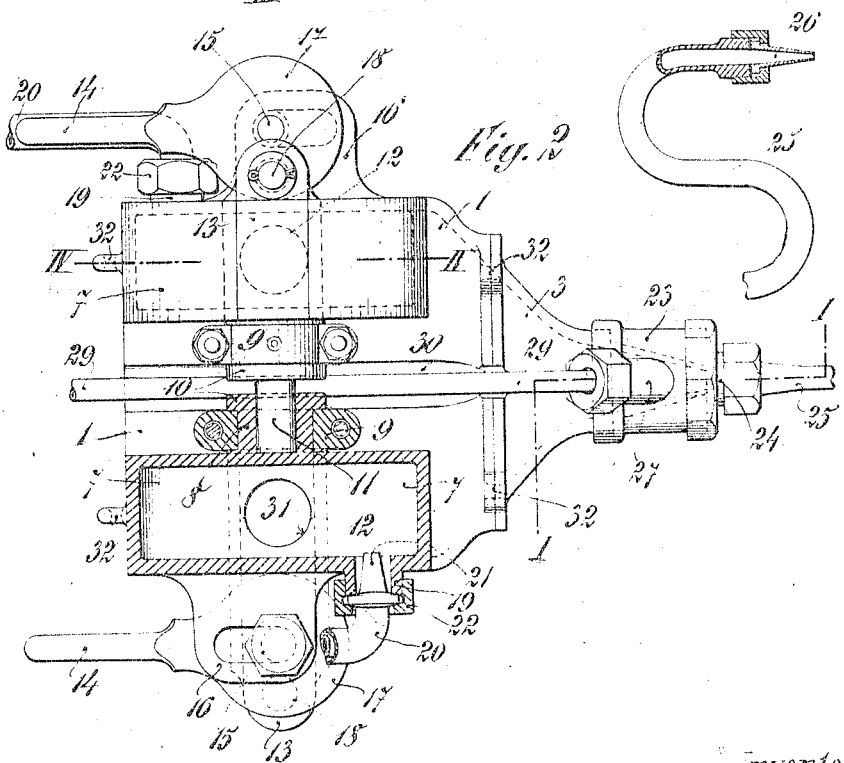
Figure 3:
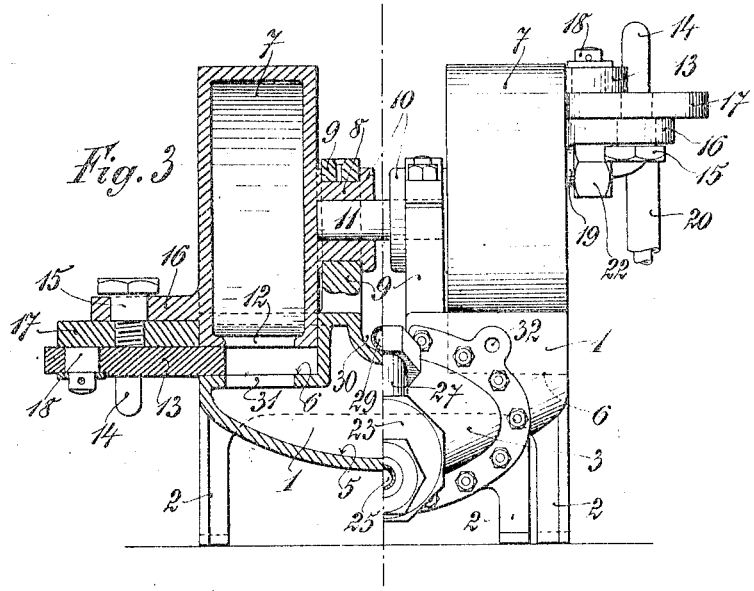
Figure 4:
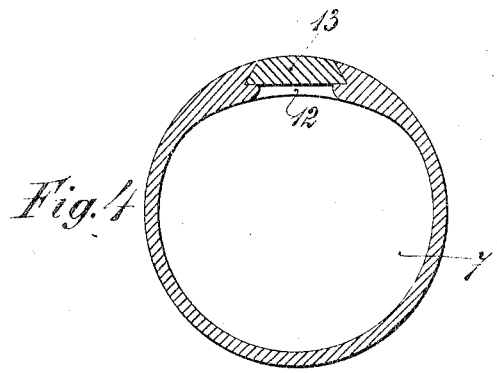
Figure 5:
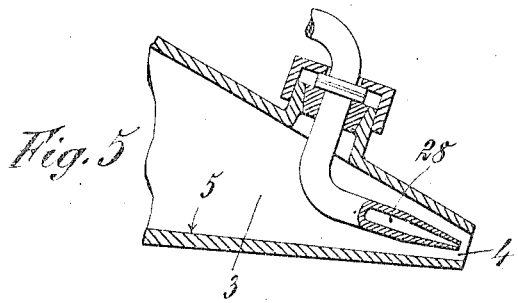

Figure 1 shows a side elevation and partial section of the apparatus, the section being taken on the section line I—I of Fig. 2. Fig. 2 is a top view and partial horizontal section of the apparatus, the left hand melting vessel being shown as sectioned on the line II—II of Fig. 1. Fig. 3 shows a front elevation and partial section of the apparatus, the left hand side of the apparatus being shown as sectioned on the line III—III of Fig. 1. Fig. 4 shows a vertical section of one of the melting vessels on the line IV—IV of Fig. 2. Fig. 5 shows a vertical longitudinal section of one form of outlet nozzle of the collecting vessel, and illustrates one practicable arrangement of blast nozzle, in connection with such outlet nozzle.

In the drawings, 1 is a collecting vessel for the molten metal and is supported by legs 2.

3 is an outlet nozzle tapering conically toward the outlet 4 and 5 is a trough-shaped bottom inclined toward the outlet 4. The top of the collecting vessel 1 has on the left and right a trough-shaped, cylindrically-curved bed 6 provided at the lowest point with an aperture 31 (Fig. 3), in which bed a cylindrical melting vessel 7 is rotatably mounted on its horizontal axis. The axes of both melting vessels 7 lie in a line and the melting vessels 7 are provided on the oppositely situated faces of the bottom with axial trunnions 8 (Figs. 2 and 3), which are mounted in bearings 9 formed on the top of the collecting vessel 1 and are secured by collars 10 against axial displacement. One common pin 11 loosely mounted axially in both trunnions 8 serves for partially relieving the beds 6 supporting the melting vessels 7 on the periphery. There is formed at the highest point of the casing of each melting vessel 7, a charging hole 12, which is adapted to be closed by a slide valve 13 moving in dovetail guides parallel to the axis of the vessel. The outer surface of the slide valve 13 completes the cylindrical casing of the melting vessel 7 (Fig. 4). The slide valve 13 can be opened or closed by means of an eccentric 17 provided with handle 14 and mounted by means of a centric pin 15 in a link 16 formed on the outer bottom of the melting vessel 7. The eccentric 17 engages with an eccentric pin 18 in the slide valve 13. The handle 14 of the eccentric 17 also serves for turning the melting vessel 7, whose hole 12 can be brought above the hole 31 by turning the melting vessel 7 at an angle of 180° for the purpose of discharging its contents into the collecting vessel.

On the outer sides of the melting vessels 7, a socket 19 (Fig. 2) is provided, wherein a blower burner 21 connected to the gas or petroleum and air supply pipe 20 is mounted and secured by means of a cap nut 22 in such a manner that during the turning of the melting vessel, it can turn independently thereof in the socket 19 and consequently its relative position or that of the fuel-air supply pipe 20 does not vary.

When, as shown in the drawings, the apparatus is intended for use for the supply of molten metal in a metal spraying process, at the mouth of the outlet nozzle 3 of the collecting vessel 1 is mounted a cylindrical cap 23, which is provided opposite to the mouth 4 of the outlet nozzle 3 with a horizontal socket 24 (Fig. 1) to which a flexible metal tube 25 is connected, which terminates in a nozzle 26 shaped in accordance with the work to be performed. The cap 23 is provided on the top with a rearwardly inclined socket 27, in which a blast nozzle 28 is interchangeably mounted and whose narrow mouth lies just above the mouth 4 of the outlet nozzle 3 of the collecting vessel 1. There communicates with the upper wide mouth of this blast nozzle 28 a pipe 29, which leads high-pressure steam, air or another gas in a superheated state to the nozzle 28. This pipe 29 extends through a channel 30 in the top of the collecting vessel 1 in order that the air, steam or other gas passing through said pipe may be heated by the heat radiated by the molten metal in vessel 1.

Eyes 32 provided in suitable places of the collecting vessel 1 serve for suspending the apparatus to chains, ropes or girths in order that the apparatus may be more easily and conveniently manipulated or moved.

The operation of the apparatus is as follows: The melting vessels 7 are turned into the position as shown in Figs. 2 and 3 on the right. After opening the slide valves 13, these vessels are fed or charged through the holes 12 with the metal to be employed and closed again after lighting the burners 21. If liquid metal is already contained in a melting vessel 7, the latter will be turned into the position shown in Figs. 1, 2 and 3 on the left after cutting off the burner 21 and the liquid metal is discharged into the collecting vessel 1 by opening the slide valve 13. This melting vessel 7 is then returned to its original position and is charged afresh as above. Now the work proper can begin i. e. the pouring or coating of any kind of articles, parts or surfaces thereof, with metal, for which purpose, when the apparatus is to be used for the spraying of molten metal high-pressure and superheated steam, air or another gas is fed through the pipe 29 into the nozzle 28 and draws the liquid metal out of the outlet 4 of the collecting vessel, sprays this metal and forces it into the flexible metal tube 25, from which the metal is passed by means of the nozzle 26 to suitable points or parts to be coated with metal. When the metal in the collecting vessel gets low, the contents of said vessel may be supplemented, in the same manner as before, from the first melting vessel, then from the second melting vessel and the latter when empty is immediately turned back again and charged afresh. The metal meanwhile melts again in the first melting vessel and can be further manipulated in a continuous operation. It is obvious that for the purpose of a larger demand, several melting vessels 7 may also be provided on one common collecting vessel by arranging them in pairs behind each other. Such an arrangement with several melting vessels may also be easily employed for the simultaneous manipulation or working of different metals, in which case, the different metals can either be alloyed in the collecting vessel, or successively applied independently of each other.

It may be stated that the blast nozzle 28 can also be arranged—as shown in Fig. 5—within the outlet nozzle 3 in order to effect an intensive superheating of the steam or gas adapted for spraying the metal.

Having now particularly described and ascertained the nature of my said invention and in what manner the same is to be performed, I declare that what I claim and wish to secure by Letters Patent is:

1. A portable melting-apparatus comprising in combination a molten-metal-collecting vessel having an inclined bottom and having a discharge spout to which molten metal in said vessel will flow, and one or more melting-vessels rotatably mounted on said collecting vessel and each provided with means for applying heat to its contents and with a discharge opening adapted to be moved into position to discharge the contents of the melting vessel into the collecting vessel by the rotation of said melting vessel.

2. A portable melting-apparatus comprising in combination a molten-metal-collecting vessel provided with one or more cylindrically-curved beds for one or more melting-vessels, and one or more melting-vessels having each a corresponding cylindrically-curved surface adapted to rest upon said bed, and means for securing each such melting vessel in place with respect to said collecting-vessel, each such melting vessel provided with means for applying heat to its contents and with discharge means whereby when said vessel is rotated its contents may be discharged into the collecting vessel.

3. A portable melting-apparatus comprising in combination a molten-metal-collecting vessel having one or more cylindrically-curved beds for one or more melting-vessels, and one or more melting vessels having each a corresponding cylindrically-curved surface adapted to rest upon said bed, each such melting vessel having also a hollow trunnion, said collecting vessel having a corresponding trunnion bearing for each such vessel, and a pivot pin for each such hollow trunnion, fitting within the hollow space thereof and carried by said collecting-vessel.

4. A portable melting apparatus comprising in combination a molten-metal-collecting vessel, and one or more melting vessels rotatably mounted thereon and each provided with a discharge opening adapted to be brought into position to discharge molten metal into said collecting vessel by rotation of such melting vessel, each melting vessel provided with valve means for closing such discharge opening comprising a slide valve mounted in guides in said vessel, and means for moving said valve.

5. A portable melting apparatus comprising in combination a molten-metal-collecting vessel, and one or more melting vessels rotatably mounted thereon and arranged to discharge molten metal thereinto, and each provided with a lateral burner-port, and means for holding a burner in operative relation with said port.

6. A portable melting apparatus comprising in combination a molten-metal-collecting vessel, and a plurality of melting vessels rotatably mounted thereon and arranged to be moved by rotation alternately into a position to discharge their contents into said collecting vessel and into a position to receive and melt a charge, said melting vessels being independently movable and adapted for independent and successive operation, whereby a substantially continuous discharge of molten metal from said collecting vessel may be maintained.

7. A portable melting apparatus comprising in combination a molten-metal-collecting vessel having a restricted discharge opening and having a bottom inclined toward said discharge opening, and a plurality of melting vessels rotatably mounted on said collecting vessel and adapted to be moved by rotation alternately to a position to discharge their contents into said collecting vessel, and to a position to receive and melt a charge, said melting vessels adapted for independent and successive operation, whereby a substantially constant flow of molten metal from the discharge opening of said collecting vessel may be maintained.

In testimony whereof, I have signed my name to this specification in the presence of two subscribing witnesses.

GEORG GABRYS.

Witnesses:
MARTIN HOENIECRJ,
JOHN J. RONTO.